J. D. SINCLAIR.
Hatchways.
No. 5,387. Reissued April 29, 1873.
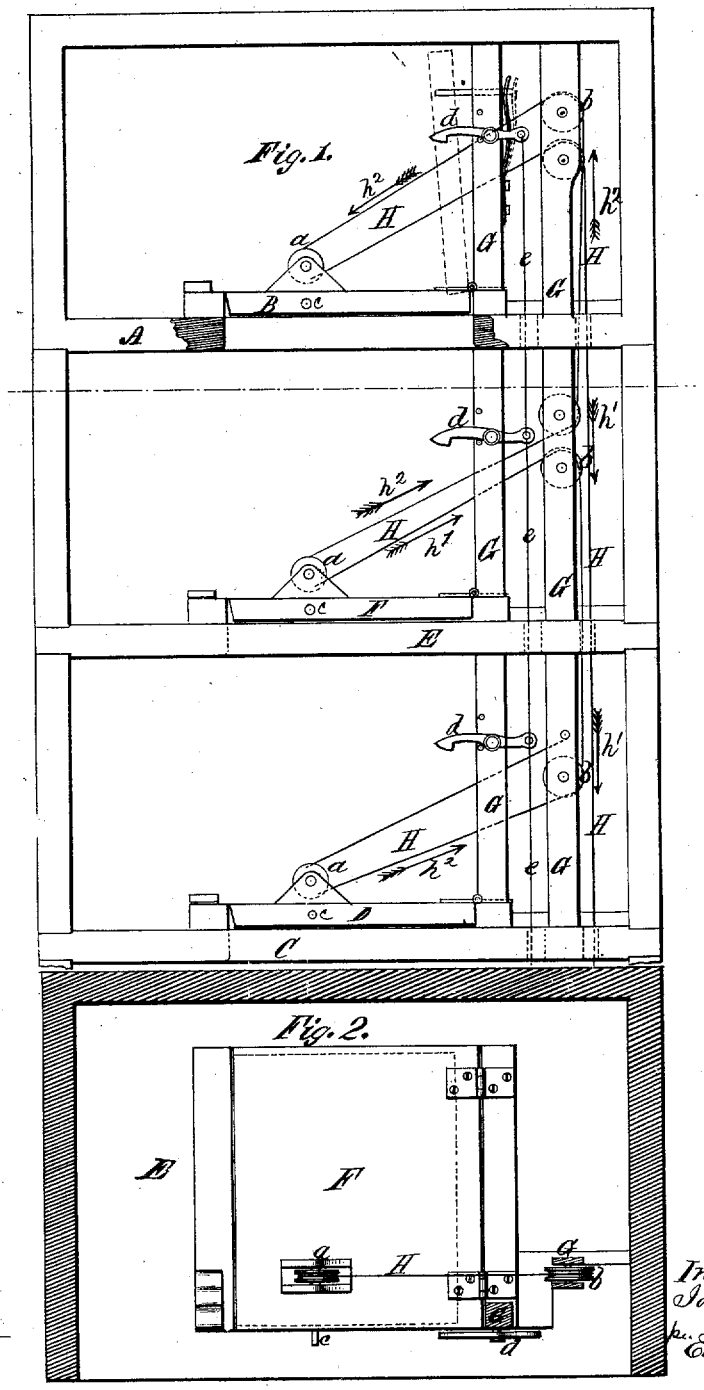
Witnesses.
Asa Farr
Geo. H. Miatt
Inventor
James D. Sinclair
by Edw. E. Quimby
Atty
THE NORRIS PETERS CO. PHOTO-LITHO., WASHINGTON, D. C.

UNITED STATES PATENT OFFICE.

JAMES D. SINCLAIR, OF BROOKLYN, NEW YORK, ASSIGNOR, BY MESNE ASSIGNMENTS, TO EDWARD A. LAMBERT, WILLIAM S. HARRIS, AND NICHOLAS B. RHODES, OF SAME PLACE.

IMPROVEMENT IN HATCHWAYS.

Specification forming part of Letters Patent No. 84,387, dated November 24, 1868; reissue No. 5,387, dated April 29, 1873; application filed April 3, 1873.

*To all whom it may concern:*

Be it known that I, JAMES D. SINCLAIR, of Brooklyn, in the county of Kings and State of New York, have invented a new and Improved Apparatus for Opening and Closing Hatches; and I do hereby declare that the following is a full, clear, and exact description thereof, which will enable those skilled in the art to make and use the same, reference being had to the accompanying drawing forming part of this specification, in which—

Figure 1 represents a side view, partly in section, of my improved opening and closing apparatus. Fig. 2 is a horizontal section of the same taken at the plane of line *x x*, Fig. 1.

My invention is in two parts, and has two objects: First, to enable a person, while standing on either one of the floors of a building containing a hatchway, to open either one or more of the hatches, commencing with the uppermost or lowermost; and, secondly, to enable a person while standing on the lower floor to close all the hatches, so that it will not be necessary for a person to go to each and every floor either to open or close the hatches. The first part of my invention consists in connecting all the hatches by means of a rope or chain that passes over pulleys fixed to stationary frame-work, so that by pulling such rope on any one of the floors the uppermost or the lowermost hatch, as the case may be, will first be opened, and then the others in succession. The second part of my invention consists in arranging swinging hooks on the frame-work for automatically catching and holding the hatches when opened, and in connecting all these hooks with a cord, so that by pulling the cord the hooks will be disengaged and the hatches permitted to fall by their own weight.

A in the drawing represents the upper floor of a suitable building in which a hatch, B, is arranged. C is the lowermost floor, having a hatch, D. E is one of the intermediate floors, having a hatch, F. On the upper floor A, or on a floor above it, is arranged a suitable hoisting apparatus, by means of which goods can be elevated or lowered to or from any one of the floors. Each one of the hatches has projecting lugs between which a roller, *a*, is held, as shown. Each hatch is hinged on one side of the floor so that it can be swung up or down at will. On the same side on which the hatches are hinged are arranged, on the floors, posts G G or other stationary devices for holding small sheave-rollers *b b*, as is clearly shown in Fig. 1. H is a rope or chain fastened with one end to some stationary device between the lowermost floor C and the next floor above.

The rope is then passed over the roller *a* of the lowest hatch D; then back over the lowest roller *b*; then up to the next story over a roller, *b*, over the roller *a* of the hatch F, and so on around all the rollers *a* of the different hatches, until, on the upper story, it passes over the uppermost roller *b*, and extends thence downward through all the floors to the lowest story. By then pulling the rope H, on any one of the floors, in the direction indicated by the arrow $h^1$, the upper hatch B will first be swung open, as shown by dotted lines in Fig. 1, and then the others successively, until, when the lowest hatch F is raised, it can be no further pulled. By pulling the rope H in the contrary direction, as indicated by the arrows $h^2$, the hatches will be raised in the reverse order—the lowermost first.

On the side of each hatch is formed a pin, *c*, which fits, when the hatch is swung open, under a hook, *d*, pivoted to the stationary post G, as shown. This hook keeps the hatch open, as shown, and retains it in that position. On every floor is such a hook, and all the hooks are connected with each other by means of a cord, *e*, as shown, so that, by pulling such cord *e*, all the hooks can at once be swung around their pivots to release the hatches, when they will fall shut by their own weight.

It is evident that, by means of the rope H, any number of the hatches may be opened, commencing with the uppermost or lowermost, according to the direction in which said rope is pulled.

If, instead of the ordinary suspended rope, an elevator is used, which consists of an up-and-down sliding platform, and which commences to operate from the lowest floor, the rope H may be especially arranged so as to first open the lower hatch, and then the others in succession.

The rope H may be arranged in many different ways, so as to connect the hatches with each other.

If the hatches should not be apt to fall by their own weight when released from the hook, springs *f* may be provided on the posts G to throw them down when thus released.

If the hatches should be arranged in pairs there must be a connection, like that above described, for every set of leaves.

What I claim is—

1. The combination of the hatches B F D with the system of pulleys *a b* and the cord or chain H, substantially as and for the purpose set forth.

2. The combination of a series or tier of hatches, B D F, with the series of hooks or latches *d d* and the cord *e*, substantially as and for the purpose described.

3. The apparatus as a whole, consisting of the hatches B D F, provided with the system of pulleys *a b*, and the cord or chain H, and the series of hooks or latches *d d*, and the cord *e*, substantially as and for the purposes described.

JAMES D. SINCLAIR.

Witnesses:

EDW. A. LAMBERT,

EDWARD FLOOD.